United States Patent [19]

Wong

[11] Patent Number: 5,020,274

[45] Date of Patent: Jun. 4, 1991

[54] PLANT HANGER

[76] Inventor: Robert K. W. Wong, 1725 Camino Lindo, S. Pasadena, Calif. 91030

[21] Appl. No.: 228,027

[22] Filed: Aug. 4, 1988

[51] Int. Cl.$^5$ .............................................. A01G 47/72
[52] U.S. Cl. ...................................................... 47/67
[58] Field of Search .................. 47/41 R, 41.11, 71, 47/67; 248/317, 318; 211/113

[56] References Cited

U.S. PATENT DOCUMENTS

| D. 240,383 | 7/1976 | Connell | 47/67 X |
| 726,079 | 4/1903 | Lord | 47/67 |
| 941,448 | 11/1909 | Haglund | 47/67 |
| 951,684 | 3/1910 | Gillespie | 47/67 |
| 1,154,627 | 9/1915 | Hall | 47/67 |
| 1,484,403 | 2/1924 | Miller | 47/35 |
| 1,712,986 | 5/1929 | Favata | 47/80 |
| 1,756,461 | 4/1930 | Hanson | 47/35 |
| 2,929,171 | 3/1960 | Josephson | 47/41.11 X |
| 4,057,210 | 11/1977 | Wellman | 248/318 |
| 4,216,623 | 8/1980 | Silver | 47/80 |
| 4,646,469 | 3/1987 | Scism | 47/67 |
| 4,821,454 | 4/1989 | Wilds | 47/71 X |

FOREIGN PATENT DOCUMENTS

| 276906 | 2/1913 | Fed. Rep. of Germany | 47/67 |
| 4647 | 2/1909 | United Kingdom | 47/67 |
| 1200371 | 7/1970 | United Kingdom | 47/67 |

Primary Examiner—John E. Murtagh
Attorney, Agent, or Firm—Charles Berman

[57] ABSTRACT

A hangable holder suitable for suspending plants and the like comprises a receptacle suitable for holding a plant and a unitary support for the receptacle. The support comprises a waterproof bottom and an exterior peripheral wall extending upwardly from the bottom. There are at least three longitudinally extending arms projecting upwardly from the exterior wall, each arm being provided with a support hole. There can be an inner wall inwardly from the exterior wall with a space between the two walls for holding articles such as decorative flowers.

10 Claims, 1 Drawing Sheet

U.S. Patent        June 4, 1991        5,020,274
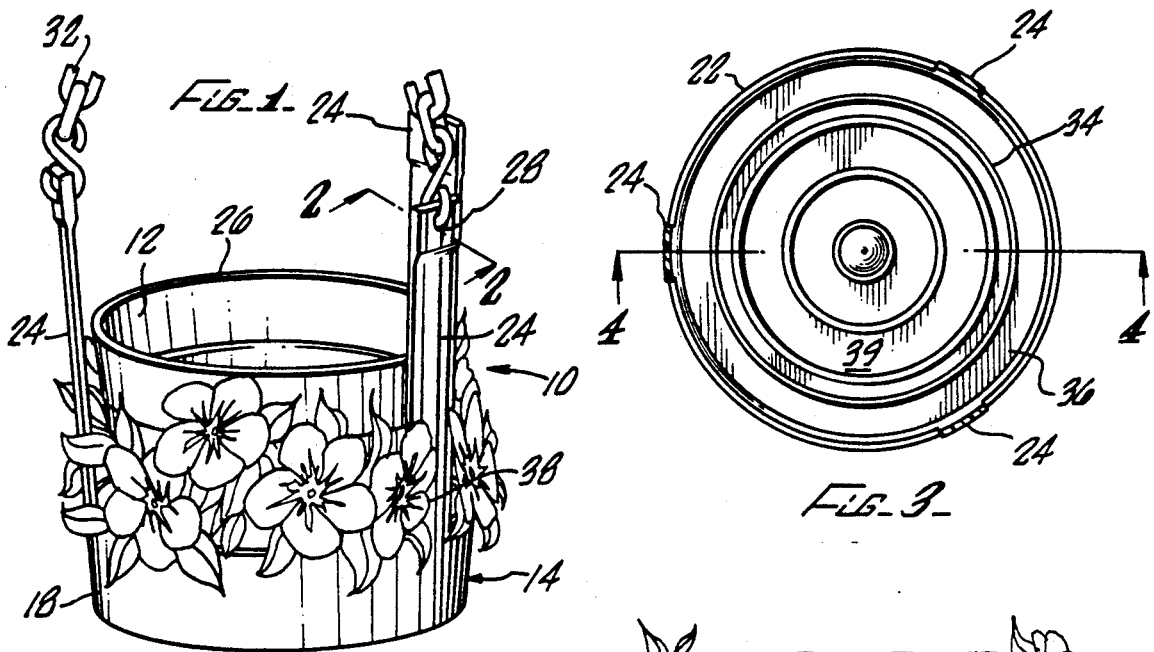
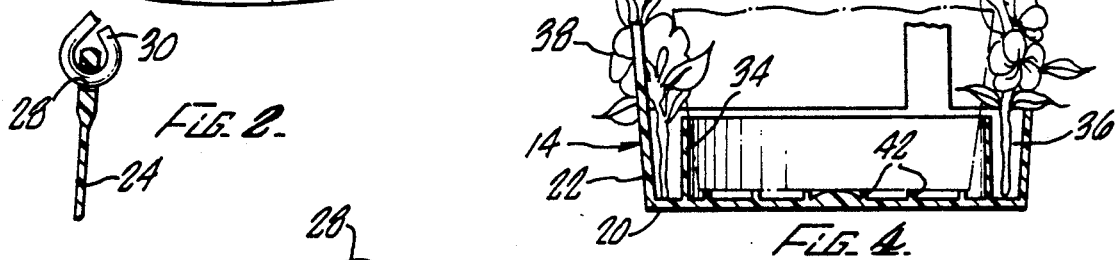
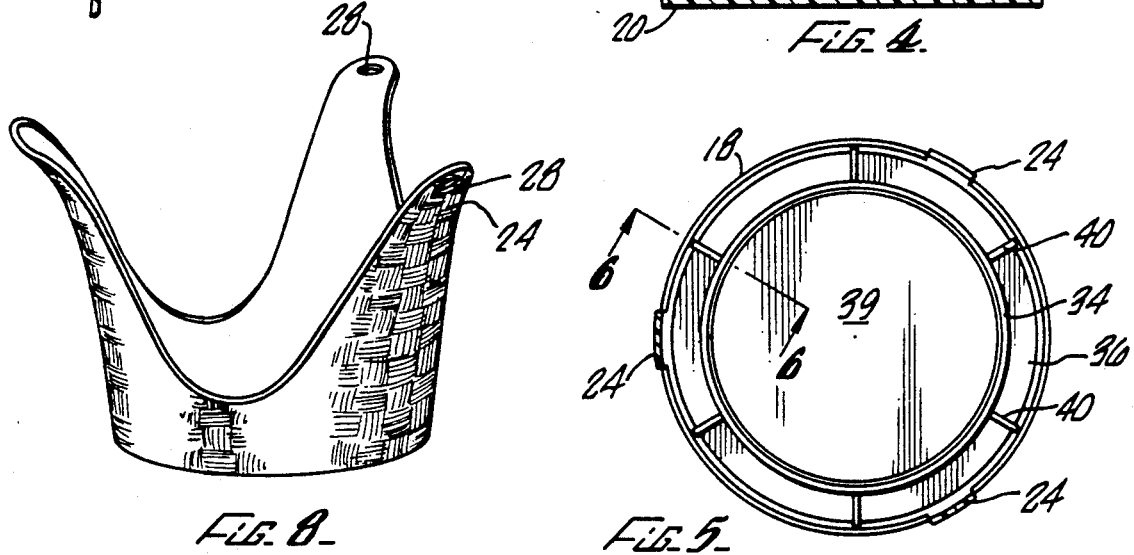
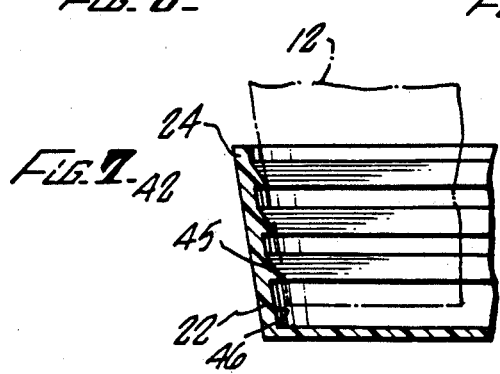

PLANT HANGER

BACKGROUND

The present invention is directed to a device for hanging plants and the like.

It is desirable that devices for hanging growing plants be light, decorative, durable, and inexpensive. For the plants to flourish, it is necessary that they be constantly supplied with sufficient moisture, while at the same time protected from excess moisture. The roots should be protected from overheating by sunlight to which the hanging supports are exposed, but access of air to the earth must be provided so that the plant roots are properly ventilated.

Difficulty has been experienced in designing such a device, particularly a device that is both inexpensive and decorative.

SUMMARY

The present invention provides a unitary, hangable support for suspending articles that satisfies these requirements. The support is particularly useful for hanging growing plants. The support comprises a solid, non-porous, non-leaking, waterproof bucket or tray. The tray comprises a bottom and an upstanding, exterior, peripheral sidewall extending upwardly from the bottom. The support also includes at least three arms projecting upwardly from the top of the sidewall. Each arm has a support hole in its upper portion for suspending the support. The arms are continuous with the wall so that the entire support can be made of the same material and can be made in a single molding operation. For example, the support can be made of a flexible polymeric material such as polyvinyl chloride (PVC) by a vacuum or injection molding process.

Preferably the support includes reinforcing means for each support hole to add to the durability of the support. The reinforcing means can be increased wall thickness of each arm adjacent the support hole.

The hangable support is particularly adapted for hanging a potted plant, the plant being in a receptacle having at least one drainage hole in the bottom. The bucket holds water draining out of the pot without leaking it to the ground or onto carpet. If desired the bottom of the bucket can have raised ridges to insure drainage from the plant receptacle by holding the drainage hole in the plant receptacle spaced apart from the bottom of the support.

The present invention is also directed to the support in combination with a receptacle, with or without a plant.

In a preferred version of the invention, the support comprises an interior wall inwardly from the exterior wall, with a space between the two walls for holding articles such as decorative artificial flowers. Preferably the internal wall is circumferentially continuous so that the space between the two walls is annular. The decorative flowers can be used to hide an unsightly receptacle such as the plastic pots often provided with growing plants.

Generally the peripheral wall of the bucket is of a height less than the height of the receptacle, but the three arms project upwardly from the peripheral wall above the top of the receptacle.

In a preferred version of the invention, gripping means such as sawtooth projections are provided on the inside face of at least one of the arms and the inside face of the bucket for firmly holding the receptacle in place.

The present invention provides an ornamental and decorative support for hanging articles such as plants. It is light, and being made of polymeric material in a single molding operation, it is inexpensive. The support protects the plant roots from overheating by sunlight, but because the bucket is shorter than the plant receptacle, access of air to the plant roots is facilitated. Plant roots are protected from sunlight, allowed ventilation, and receive adequate moisture, without being waterlogged.

DRAWINGS

These and other features aspects and advantages of the present invention will become better understood with reference to the following description appended claims and accompanying drawings where:

FIG. 1 is a perspective view of a support according to the present invention being used for hanging a flowerpot;

FIG. 2 vertical sectional view taken along line 2—2 of FIG. 1 of an arm of the support of FIG. 1;

FIG. 3 is a horizontal sectional view of the support of FIG. 1 taken on line 3—3 of FIG. 1;

FIG. 4 is another sectional view of the support of FIG. 1 taken on line 4—4 in FIG. 3;

FIG. 5 is a sectional view similar to the view of FIG. 3 of another of a support according to the present invention;

FIG. 6 is a sectional view of the support of FIG. 5 taken on line 6—6 in FIG. 5;

FIG. 7 is a vertical sectional view similar to the view of FIG. 6 of another version of a support according to the present invention; and FIG. 8 is a perspective view of a ceramic version of a support according to the present invention.

DESCRIPTION

With reference to FIGS. 1-4, a hangable holder 10 according to the present invention comprises a receptacle 12 suitable for holding a plant and a support 14 for the receptacle 12. The receptacle 12 can be any container suitable for holding articles, and typically is a pot that is conventionally used for holding a plant, and preferably the type of pot having at least one drainage hole 16 in its bottom. The receptacle 12 can be made of any material, including ceramic, plastic, and metal. One advantage of the present invention is that due to the decorative nature of the support 14, plants obtained from nurseries and the like can be kept in their original, unattractive container.

The support 14 comprises a truncated bucket or base portion 18 comprising a solid, non-porous, non-leaking, waterproof bottom 20 and an upstanding, exterior, peripheral, circumferential wall 22 that extends upwardly from the bottom 20. Preferably the exterior wall 22 slopes outwardly, i.e. the bucket is an inverted, truncated right cone, to accommodate the sloping sides conventionally present in a plant receptacle 12. Generally the height of the wall 22 is less than the height of the receptacle 12.

The support 14 also includes at least three longitudinally extending arms 24 projecting upwardly from the exterior wall 22, generally above the top 26 of the receptacle 12. Each arm 24 has at least one support hole 28 in its end portion for suspending the support by such means as hooks 30 and wire, yarn, chain 32 or the like.

Preferably the support 14 is of monocoque construction and unitary, i.e. the bucket 18 and the arms 24 are made out of the same material with the entire support being made in a single molding operation such as vacuum molding and injection molding. This allows the support to be inexpensive.

Since much of the tension on the support 14 is at the support holes 28, preferably this region of the support 14 is reinforced, such as by increasing the wall thickness of each arm 24 adjacent its support hole 28, as shown in FIG. 2. The wall thickness of each arm 24 adjacent its support hole 28 is greater than the wall thickness of the arm 24 removed from the support hole 28. Alternatively, reinforcement can be provided by a metal ring, grommet, or the like.

In an alternate version of the invention, plastic straps can be used in place of the chain 32. Each strap can be provided with a projecting button that snap fits into the support hole 28 in each arm. This provides removable insertion into each support hole 28.

As shown in FIG. 3, preferably the support 14 includes an interior wall 34 that is located inwardly from the exterior wall 22 with a space 36 therebetween. Preferably, but not necessarily, as shown in the drawings, the interior wall 34 is circumferentially continuous so that the space 36 between the two walls is annular. This space 36 is preferably sized to receive decorations such as decorative artificial flowers 38, while the region 39 within the interior wall is sufficiently large to hold the receptacle 12. Inclusion of the annular space 36 for holding artificial flowers 38 or the like adds to the decorative effect of the holder 10 of the present invention.

As shown in FIG. 4, the interior wall 34 can project upwardly from the bottom 20, or it can be supported by a plurality of ribs 40 connected to the inside of the outer exterior Wall 22 as shoWn in FIGS. 5 and 6.

To insure adequate drainage of the flowerpot 12 preferably means are provided for holding the bottom of the flowerpot 12 spaced apart from the bottom wall 20 of the support 14. As shown in FIG. 4, this can be accomplished with a plurality of circular ridges or projections 42 projecting upwardly from the bottom wall 20 of the support. The ridges 42 can be in shapes other than circular.

As shown in both FIGS. 1 and 4, the peripheral wall 22 ends proximate to the bottom end of the receptacle 12; the peripheral wall 22 and the arms 24 of the support 14 together define openings which (and are thus adapted to) provide access to a substantial portion of the side of the article suspended in the support 14, for example, the receptacle 12, especially to portions proximate to the bottom end of the receptacle 12.

The support 14 can be made of a variety of materials, including porcelain, ceramic, metal, and plastic. Preferably the support 14 is made of a plastic material so it can easily be formed by a molding operation. Among the plastics that are suitable are polyethelene, polystyrene, and polyvinylchloride. Preferably a flexible plastic material such as polyvinylchloride is used. Rubberized material can also be used for added longevity and durability.

An advantage of using a polymeric material is that the support 14 can be provided in a variety of colors. The support can be matched to the color of the receptacle 12 for decorative purposes.

Various versions of the present invention are feasible. For example, as shown in FIG. 7, the support 14 need not have the interior wall 34. In addition, gripping means can be provided for insuring that the receptacle 12 does not accidentally fall out of the support 14. The gripping means can be a roughened interior surface in any portion of the support 14 that contacts the receptacle 12. Alternatively it can be saw tooth shaped projections 43 on the inner face 44 of the interior wall 34 (FIG. 6), or saw tooth projections 45 on the inner face 46 of the outer wall 22 (FIG. 7), and/or on the inner face 48 of the arms 24 (FIG. 7).

Other versions of the invention include having more than three arms, and embossing the outer surface of the arms and bucket so that they have a decorative appearance as shown in FIG. 8. In addition to embossing, the mold used for forming the support 14 can have decorative patterns worked into the mold, such as a basket or weave type pattern.

In another version of the invention, the support 14 can be provided with a dish placed underneath the receptacle 12 for catching draining water.

The support 14 is not limited to use for pots for holding hanging plants. It can also be used for hanging articles such as birdseed, suet, candy, and children's toys, clothes, and/or crayons. When used for such items, the support 14 can be provided with an internal removable cup or other receptacle.

Thus the present invention provides a holder for growing plants that is light, ornamental, durable and inexpensive. The bucket 18 prevents water from dripping to the ground, but at the same time allows drainage from the receptacle 12 without exposing plant roots to excess moisture. The roots have access to air for proper ventilation, and the roots are prevented from overheating from the sun. Moreover watering of the plants is facilitated by having the outer peripheral wall 22 be of smaller height than the receptacle 12. When watering the plant, merely by inserting a finger into the space between the plant receptacle 12 and the bucket 18, the point at which water flows out of the receptacle 12 can easily be determined.

Although the present invention has been described in considerable detail with reference to certain preferred versions thereof, other versions are possible. For example, as shown in FIG. 8, the support 14 can be made of a ceramic material, and the top of the arms can curve or flair outwardly for added decorative effect. Also more than one support hole 28 can be provided in each arm. Therefore the spirit and scope of the appended claim should not be limited to the description of the preferred versions contained herein.

What is claimed is:

1. A hangable holder suitable for suspending plants and the like comprising:
   (a) a receptacle suitable for holding a plant, the receptacle having at least one drainage hole in the bottom; and
   (b) a unitary support for the receptacle, the supporting comprising (i) a solid, non-porous, non-leaking, waterproof bottom, (ii) an upstanding, exterior, peripheral wall extending upwardly from the bottom, the height of the wall being less than the height of the receptacle, with the wall ending proximate to the bottom end of the receptacle, and (iii) at least three longitudinally extending arms projecting upwardly from the exterior wall above the top of the receptacle, each arm having a support hole in its upper portion for suspending the support; wherein the peripheral wall and the arms are adapted to provide access to a substantial portion of the side of the receptacle, including a portion proximate to the bottom of the receptacle; wherein each arm has means for reinforcing the arm adjacent its support hole and wherein the entire support is made of the same material; and wherein the support is formed of a plastic material, and the reinforcing means comprises the wall thickness of the arm adjacent the support hole being greater than the wall thickness of the arm away from the support hole.

2. A hangable holder suitable for suspending plants and the like comprising:
(a) a receptacle suitable for holding a plant, the receptacle having at least one drainage hole in the bottom; and
(b) a unitary support for the receptacle, the supporting comprising (i) a solid, non-porous, non-leaking, waterproof bottom, (ii) an upstanding, exterior, peripheral wall extending upwardly from the bottom, the height of the wall being less than the height of the receptacle, with the wall ending proximate to the bottom end of the receptacle, and (iii) at least three longitudinally extending arms projecting upwardly from the exterior wall above the top of the receptacle, each arm having a support hole in its upper portion for suspending the support; wherein the peripheral wall and the arms are adapted to provide access to a substantial portion of the side of the receptacle, including a portion proximate to the bottom of the receptacle, and wherein the support comprises an inner wall inwardly from the exterior wall, with a space between the two walls for holding articles.

3. The holder of claim 2 wherein the inner wall is circumferentially continuous so that the space between the two walls is annular.

4. The holder of claim 2 wherein the space between the two walls is sized to receive decorative artificial flowers.

5. A unitary, hangable support for suspending articles comprising:
(a) a solid, non-porous, non-leaking, waterproof bucket comprising a bottom and an upstanding, exterior, peripheral side wall extending upwardly from the bottom; and
(b) at least three arms projecting upwardly from the top of the side wall, each arm having a support hole in its upper portion for suspending the support, the arms being continuous with the wall, and wherein the entire support is made of the same material so that the entire support can be made in a single molding operation; and wherein a substantial portion of the side of the article suspended is accessible between the arms; and wherein the support comprises an interior wall inwardly from the exterior wall, with a space between the two walls.

6. The support of claim 5 wherein the internal wall is circumferentially continuous so that the space between the two walls is annular.

7. The support of claim 6 wherein the space between the two walls is sized to receive decorative artificial flowers, and the space within the interior wall is sufficiently large to hold a flower pot; the pot having at least one drainage hole in the bottom, the height of the side wall of the support being shorter than the height of the pot, with the side wall ending proximate to the bottom end of the pot, and the three arms of the support extending above the top of the pot.

8. The support of claim 5 including gripping means on the inside face of the interior wall for securely holding an article in the holder.

9. A hanging plant basket comprising:
(a) a pot suitable for holding a plant, the pot having at least one drainage hole on the bottom; and
(b) a unitary, polymeric support for the pot, the support comprising:
(i) a solid, non-porous, non-leaking, waterproof bottom;
(ii) an upstanding, exterior, peripheral wall extending upwardly from the bottom, the height of the wall being less than the height of the pot, with the wall ending proximate to the bottom end of the pot;
(iii) a circumferentially continuous inner wall inwardly from the exterior wall, with an annular space between the two walls suitable for receiving decorative artificial flowers, the receptacle being within the inner wall; and
(iv) at least three longitudinally extending arms projecting upwardly from the exterior wall above the top of the receptacle, each arm having a support hole in its upper portion for suspending the support; wherein the peripheral wall and the arms are adapted to provide access to a substantial portion of the side of the pot, including a portion proximate to the bottom of the pot.

10. The holder of claim 9 including means for spacing the bottom of the pot from the bottom wall of the support so water can drain out of the pot.

* * * * *